United States Patent [19]
Waltman et al.

[11] 3,883,280
[45] May 13, 1975

[54] APPARATUS FOR CONTROLLING THE EXTRUSION OF PARISONS

[75] Inventors: Robert E. Waltman; John B. Coast; Gary A. Hinz, all of Baton Rouge, La.

[73] Assignee: Ethyl Corporation, Richmond, Va.

[22] Filed: June 7, 1973

[21] Appl. No.: 367,701

Related U.S. Application Data

[60] Division of Ser. No. 129,142, March 29, 1971, which is a division of Ser. No. 887,939, Dec. 24, 1969, Pat. No. 3,649,148, which is a continuation-in-part of Ser. No. 695,636, Jan. 4, 1968, abandoned.

[52] U.S. Cl. ............... 425/162; 425/326 B; 264/40
[51] Int. Cl. .......................................... B29d 23/04
[58] Field of Search ... 264/313, 40; 425/162, 326 B, 425/465, 466, 155; 164/155

[56] References Cited
UNITED STATES PATENTS

| | | | |
|---|---|---|---|
| 3,186,032 | 6/1965 | Harwood | 425/155 X |
| 3,209,404 | 10/1965 | Hagen | 425/466 |
| 3,245,111 | 4/1966 | Branscum | 425/326 B |
| 3,302,254 | 2/1967 | Moriyama | 164/155 |
| 3,327,350 | 6/1967 | Limbach | 425/381 |
| 3,345,690 | 10/1967 | Hagen | 425/145 |
| 3,368,241 | 2/1968 | Williams | 425/162 |
| 3,386,132 | 6/1968 | Fischer | 425/381 |
| 3,538,548 | 11/1970 | Tenner | 425/141 |

FOREIGN PATENTS OR APPLICATIONS

832,718  4/1960  United Kingdom............ 425/156

*Primary Examiner*—Francis S. Husar
*Attorney, Agent, or Firm*—Donald L. Johnson; John F. Sieberth; E. Donald Mays

[57] ABSTRACT

A process and apparatus for programming the wall thickness of thermoplastic parison extrusions for subsequent conversion to blow-molded plastic articles. The apparatus for forming the parison includes a mandrel or core pin and a die assembly wherein the mandrel is made from a material having predictable and repeatable elastic properties and has enclosed therein a piston and piston rod. The piston rod extends the full length of the mandrel and is connected to the piston on the rod's opposite end. The piston is contained in a chamber that is connected to a hydraulic fluid source. The wall thickness of the formed parison is changed by varying the size of the extrusion orifice through expansion or contraction of the mandrel produced by the application of release of hydraulic pressure on the top of the piston. The die assembly is particularly suited for extrusion of parisons from heat sensitive thermoplastic material such as polyvinyl chloride since no sliding surfaces are utilized which are known to trap and cause degradation of heat sensitive thermal plastics.

3 Claims, 15 Drawing Figures

PATENTED MAY 13 1975 3,883,280
SHEET 1 OF 5
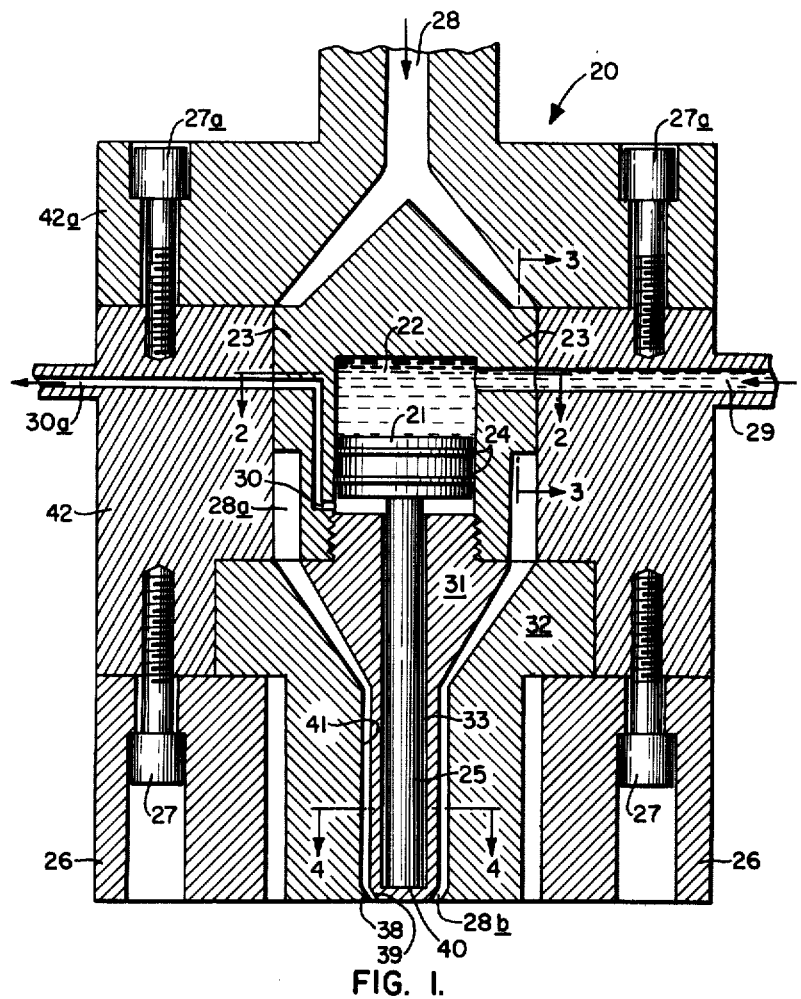
FIG. 1.
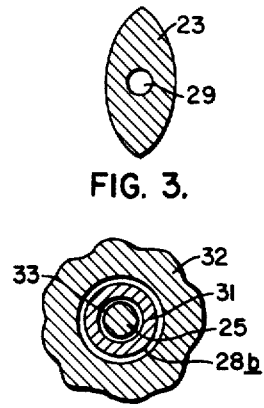
FIG. 3.
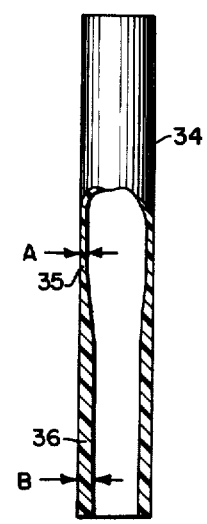
FIG. 4.
FIG. 5.
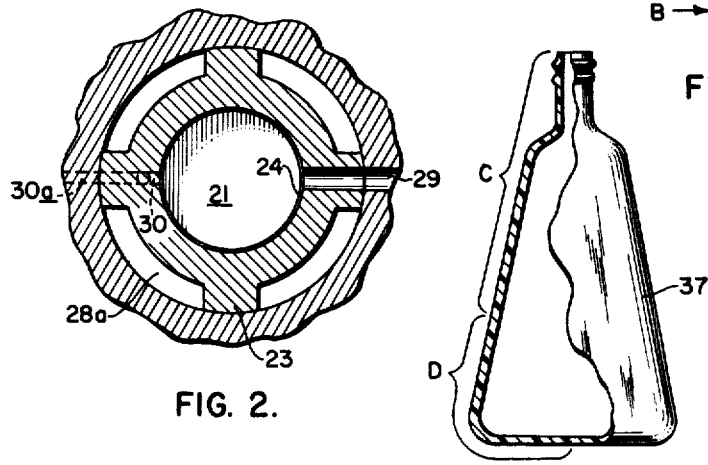
FIG. 2.
FIG. 6.

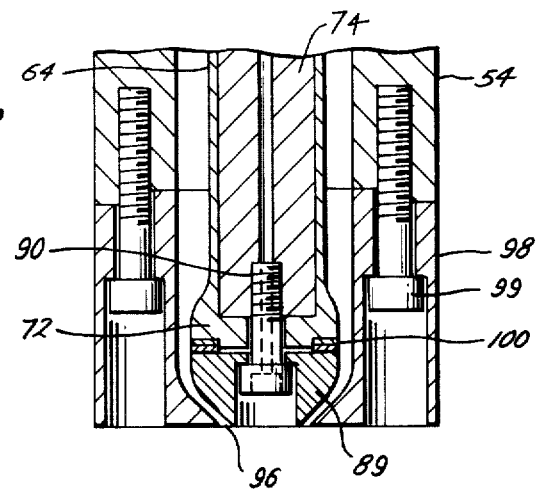
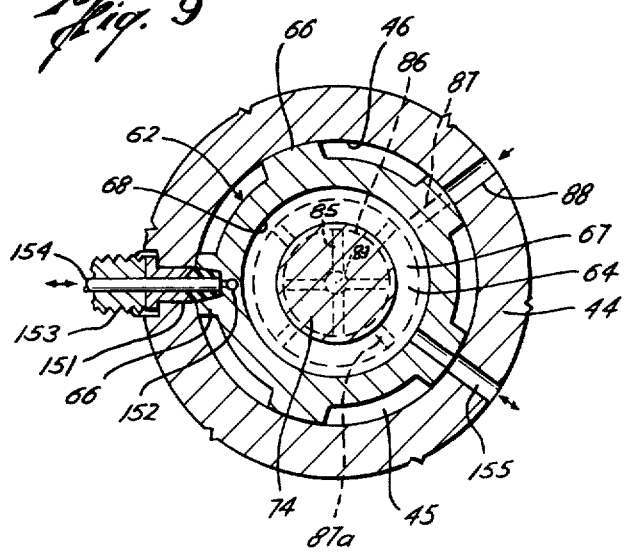
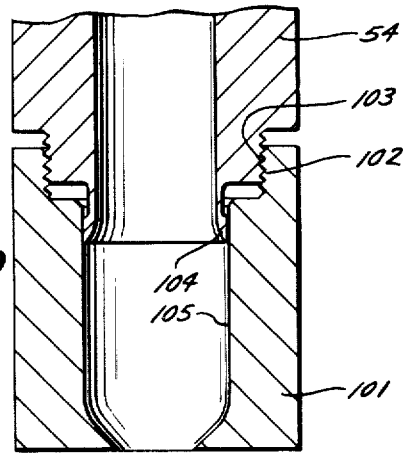
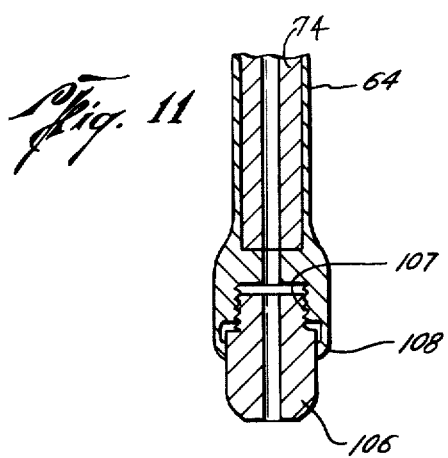

APPARATUS FOR CONTROLLING THE EXTRUSION OF PARISONS

This is a division, of application Ser. No. 129,142, filed Mar. 29, 1971, which is a division of Ser. No. 887,939, filed Dec. 24, 1969, now U.S. Pat. 3,649,148, which is a continuation-in-part of Ser. No. 695,636, filed Jan. 4, 1968, now forfeited.

BACKGROUND OF THE INVENTION

1. Field of the Invention

This invention relates to a method and apparatus for the manufacture of plastic parisons which produce improved material distribution in articles made by blow molding the parisons.

2. Description of the Prior Art

There have been many attempts to design a parison die which would be capable of varying the wall thickness of the extruded parison. Most dies of this class involve a body or a cup having an inlet and outlet for flow of plastic material and have positioned centrally and extending throughout the length thereof, a core pin or mandrel which terminates at the die face. This arrangement provides a tubular channel for passage of plastic material from an inlet source to an annular orifice which forms a tubular parison for subsequent blow molding.

To achieve a blown article having a wall thickness of uniform dimensions, many devices are available which provide a parison having varying wall thickness. Typical among the more recently patented devices are those disclosed in U.S. Pat. Nos. 3,218,672 and 3,209,404. The disadvantages encountered in using these die assemblies are centered upon the presence of sliding surfaces which are in contact with the molten plastic material.

Polymer build-up and subsequent heat degradation of this stagnant polymer occurs at these sites, causing expensive down-time during the necessary cleaning operations. In addition, polymer build-up at these sliding surfaces causes streaks and discolorations in the parisons being extruded. Thus, the prior art die assemblies have not been satisfactory for use in extruding parisons for polyvinyl chloride since the polymer is particularly sensitive to thermal degradation. Die assemblies that have sliding surfaces provide a discontinuity between the fixed surface and the moving surface which causes polymer build-up to occur. The polymer that sticks to these discontinuous surfaces burns and decomposes causing further decomposition of the plastic flowing over these surfaces.

The parison die assembly of the present invention, hereinafter described, overcomes these and related problems by eliminating moving surfaces along the flow path of plastic being forced through the die assembly.

SUMMARY OF THE INVENTION

According to the invention, there is provided a novel die structure for use in the extrusion of tubular parisons of plastic material comprising, in combination, a die assembly having an inlet and outlet for the flow of plastic material under pressure, the interior walls of said die defining a tubular bore in fixed relation to and communicating with the outlet and of a suitable cross-sectional shape to suit the cross-sectional shape of the parison to be extruded through said bore, a core of complimentary cross-sectional shape disposed in fixed centered relation to the outlet end of the bore of the die to define an annular orifice of a predetermined width for extrusion of a parison of a predetermined wall thickness, the core being comprised of an expansionable material, the lower end of said core having means for restricting plastic material flow when the core is elastically extended downwardly along the vertical axis thereof, the core containing interiorly therein a rod connected at its upper end to a piston and at the opposite end being in a touching relation to the bottom of the closed end of said core, the piston being housed in a piston chamber having an inlet and outlet for the passage of a pressure fluid, whereby, under pressure, the piston is displaced downwardly forcing the connected rod to expand the core along its vertical axis decreasing the width of the annular orifice to reduce the thickness of the wall in the parison. Alternatively, the terminal end of the core pin provides an outwardly inclined surface matching an inclined surface at the outlet end of the bore, whereby the thickness of an extruded parison may be increased by elongation of the core pin.

BRIEF DESCRIPTION OF THE DRAWING

The invention will be more readily understood from a reading of the following specification and by reference to the accompanying drawings wherein an example of the invention is shown, and wherein:

FIG. 1 is a cross-sectional side view of a die made in accordance with the invention;

FIG. 2 is a horizontal sectional view along line 2—2 of FIG. 1 illustrating the piston chamber, piston and spider supports for the core located within the die body of the invention;

FIG. 3 is a vertical sectional view along line 3—3 of FIG. 1 illustrating the inlet channel for passage of pressure fluid through the spider;

FIG. 4 is a horizontal sectional view along line 4—4 of FIG. 1 showing arrangement of the piston rod, core pin and die body of the invention;

FIG. 5 is a side view of a parison having a portion cut away to illustrate the varying wall thickness produced by the die of the present invention;

FIG. 6 is a side view of a blow-molded bottle produced from the parison of FIG. 5;

FIG. 8 is an elevational, sectional view of yet another embodiment of the lower section of the die of the present invention;

FIG. 9 is a cross-sectional view taken along line 9—9 of FIG. 7;

FIG. 10 is an elevational, sectional view of still another embodiment of the lower end of the die of the present invention;

FIG. 11 is an elevational, sectional view of another embodiment of the adjustable mandrel tip portion of the die of the present invention;

Similar reference numerals are supplied to corresponding parts throughout these views.

DESCRIPTION OF THE PREFERRED EMBODIMENTS

Figure 7:
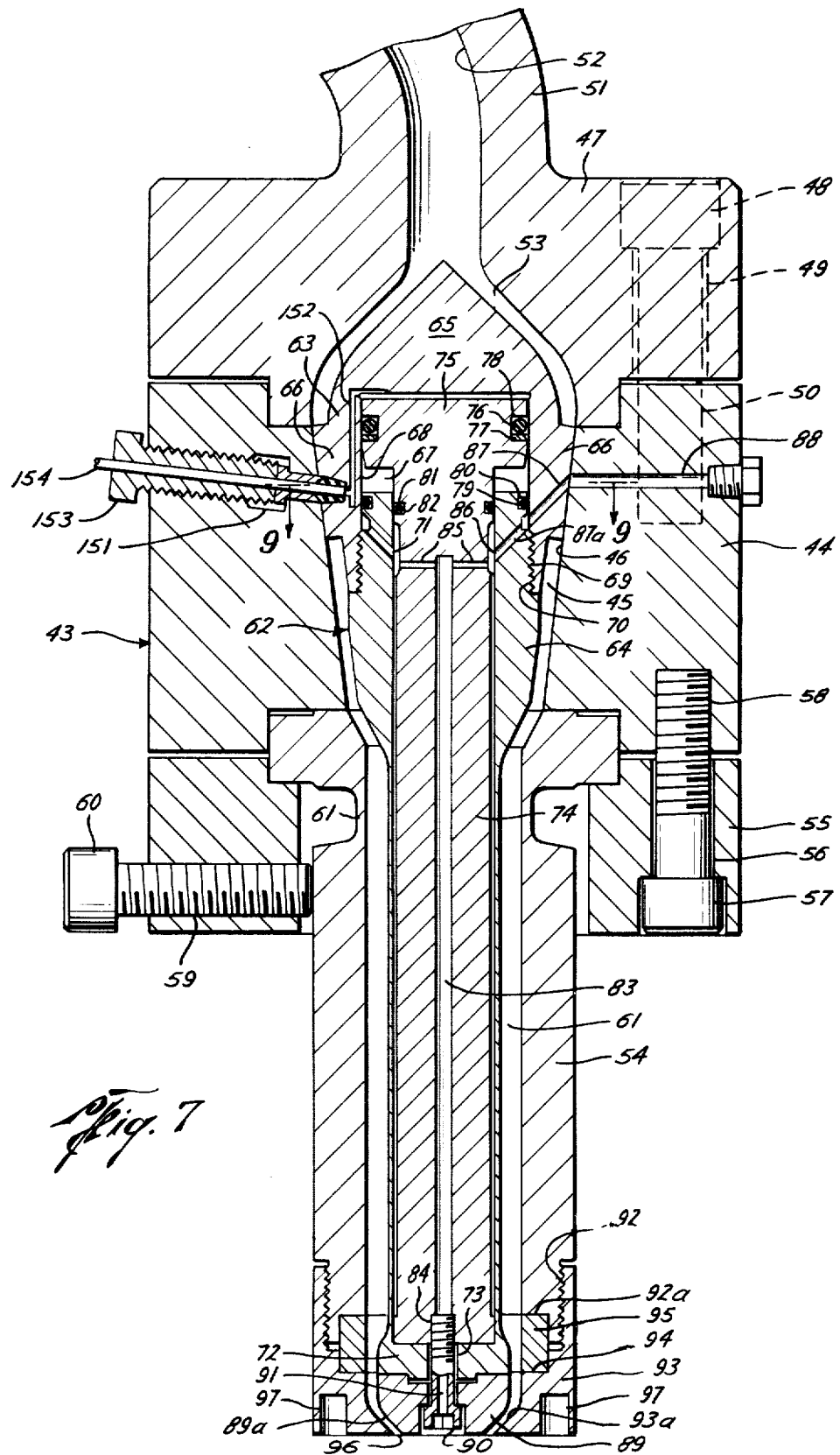
FIG. 7 is an elevational, sectional view of another embodiment of a die made in accordance with the present invention.

Referring to the drawings, and first to FIGS. 1, 5 and 6, the reference numeral 20 designates generally a die assembly made in accordance with the invention for extruding plastic tubes or parisons 34, as seen in FIG. 5, of polyethylene, polystyrene, particularly polyvinyl chloride (PVC), or other thermoplastic or thermosetting material of constant outer diameter (called O.D.) but varying internal diameter (or I.D.). The decrease in wall thickness of the upper portion of the parison indicated at 35 having a thickness A from that of the lower portion 36 having a thickness B enables the production of various plastic bottles such as the one indicated at 37 in FIG. 6, or other hollow articles, with a substantially uniform wall thickness, when the parison is ballooned out under pneumatic pressure to meet the walls of a mold cavity (not shown). In FIG. 6 the wall thickness of bottle 37 is depicted in the general areas of C and D, corresponding respectively with areas of the upper portion 35 of the parison 34 (having thickness A) and the lower portion 36 (having thickness B).

Thus, the parison is tailored by variation in wall thickness to fit the particular needs of any given shape of molded articles that could otherwise not be produced without too much variation in wall thickness with parison of uniform wall thickness. When a bottle 37, like that shown in FIG. 6, is blow molded from a parison of increased wall thickness in its lower portion, it is possible to provide sufficient polymer material for the enlarged lower portion D of the bottle 37 so that the wall thickness of this portion of the bottle is substantially the same as that of the smaller upper portion C of the bottle.

While, as shown in FIGS. 4 and 5, the die 20 is constructed to produce parisons of circular cross-section, it should be understood that the present invention is not limited to that shape but can be used to produce parisons of many different shaped cross sections.

Referring to the embodiment of the invention shown in FIG. 1, the die assembly, designated generally by the numeral 20, is provided with a central body portion 42 having an upper body portion 42a attached to its top surface by means of cap screws 27a. A shell or lower body portion 32 is connected to the bottom surface of the central body portion 42 by means of ring 26 connected to the central body portion 42 by cap screws 27.

The body arrangement provides a continuous channel 28-28b, or bore, through which plastic material is forced under pressure from bore 28 through bore 28b, existing at the die face at 28b to form a parison. A core or pin 31 of complementary cross-sectional shape to the passage or bore 28-28b, is disposed in fixed central relation to the outlet end 28b of the bore of the shell or lower body portion 32 to provide an annular orifice defined by the inwardly inclined surface portions 38 and 39 present at the lower end of the body and core respectively. The distance maintained between the surface portion 38 of the body and the surface portion 39 of the pin defines the wall thickness of the parison being extruded through the annular orifice as plastic material flows under pressure through bores 28, 28a and 28b.

The body portions 42a, 42 and 32, with retaining the 26, as illustrated in FIG. 1, are merely representative of only one embodiment of the die of the present invention useful for forming parisons for blow molding and should not be construed as limiting the present invention to that particular assembly. The present invention encompasses any suitable die assembly having a body portion having an inlet and outlet for the passage of plastic material therethrough, having a core pin arrangement centrally located therein, the core pin having means contained therein wherein the pin may be stretched or elongated along its longitudinal axis causing a reduction or increase in the width of the orifice opening. This is accomplished by the present invention without having sliding surfaces along the path of plastic flow.

As seen in FIGS. 1 and 4, the core pin 31 is disposed in the interior of body portions designated by numerals 42 and 32, extending down through the terminating at the bottom face of the lower body portion 32, the lower terminal portion of the pin 31 being on an even plane with the bottom face of the lower body portion 32 when the pin 31 is in its relaxed or normal state.

In order to vary the flow of plastic material as it passes down through the bore 28b in forming a parison 34 having varying wall thickness, as illustrated in FIG. 5, the core pin 31 is provided with means to reduce or increase the orifice opening by bringing together faces 38 and 39. This is accomplished by the provision of a core pin 31 composed of an expansionable material having predictable and repeatable elastic properties, such as titanium, which has located therein a piston 21 and piston rod 25, the piston being housed in a piston chamber 22 connected to a source of hydraulic fluid through a hydraulic fluid inlet channel 29. The core pin can also be fabricated from suitable plastic material having a high melting point and the required elastic properties. There is additionally provided a sealing means 24, such as O rings, extending circumferentially around the piston and a fluid exit port 30 and passage 30a to allow fluid seepage to escape if the hydraulic fluid passes between the piston 21 and the wall of the piston chamber 22.

The piston rod 25 extends downward with the pin 31 in a piston rod channel 33 of a size to provide free movement between the piston rod 25 and the inner wall of pin 31. One end of the piston rod 25 is in contact with the bottom of the piston rod channel as illustrated at 40. The opposite end of the piston rod 25 is connected to the piston 21. When hydraulic fluid is forced under pressure into the piston chamber 22, this piston 21 is pushed in a downward movement causing the connected piston rod 25 to slightly extend the bottommost portion of the core pin 31 beyond the annular orifice at the discharge end of bore 28b. This moves inclined surfaces 38 and 39 closer to each other thereby decreasing the width of the orifice to produce the decreased thickness wall section 35 in the parison 34 as seen in FIG. 5.

In order to use the above piston rod movement to best advantage in programming parisons of varying wall thickness, the lower body 32 has a slightly reduced concentric lower end opening at bore 28b, providing the inwardly inclined face 38 directed toward the pin 31. The lower end of the pin 31 provides an inwardly inclined face 39 which conforms in angular shape and direction to the reduced concentric lower end of the lower body 32. The annular orifice of bore 28b has a uniform dimension along the bore wall 41 while the expansionable metal pin 31 is in a relaxed and unextended condition.

In varying the I.D. of a parison 34, it provides an upper portion 35 and a lower portion 36 having dimensions A and B, respectively. Hydraulic pressure is applied to the top of piston 21 moving piston rod 25 downward to press against the bottom 40 of pin 31 to stretch or elongate the pin. This causes the beveled pin surface 39 to approach the lower body face 38, restricting the size of the annular orifice at the lower downward flow of plastic material along end of bore 28b. Thus the wall thickness of the parison 34 exiting at the annular orifice from bore 28b is reduced from dimension B downward to dimension A.

Reducing the hydraulic pressure relieves the downward thrust of the piston 21 and rod 25 allowing the pin 31 to contract to its normal, unextended length. In some applications of the invention, it would be useful to reverse the direction of taper of the lower end of the core pin 31 and lower end of the bore wall 41. Thus, axial elongation of core 31 could cause face 38 to become more distant from the core pin face 39, resulting in an increase in the wall thickness of a parison being extruded.

In a typical parison forming die, the lower body 32 is provided with a heating means, not shown, in order to maintain the plastic material in an extrudable condition throughout the plastic flow from bore 28 through bore 28b. Also not shown are conventional means for nipping off one parison after another, as well as provision for injecting air into the pinched parison and a mold for bottle forming.

FIG. 4 further illustrates the concentric arrangement of the piston rod 25 within the piston rod channel 33 located in core pin 31 which extends downwardly through the lower body 32. The core pin 31 is supported within the body portion 32 and 42 by means of spiders 23. A typical arrangement of spiders is illustrated in FIG. 2 wherein there is shown the hydraulic fluid inlet channel 29 and fluid exit port 30 and channel 30a. Plastic material flows down past the spiders 23 through bore 28a, the passage of plastic material through bore 28a being continuous from bore 28 through bore 28b.

One of the most beneficial advantages of the present invention is to total absence of moving surfaces which are in communication with the passage of plastic material through bore 28 to 28b. Thus, there are no sites at which polymer build-up and degradation can occur, as often happens when using sliding surfaces along the passage of plastic flow.

The die assembly can be made from tool steel or any other material of suitable strength. Preferably, the interior surfaces of the die are chrome-plated to reduce possible sticking when the die assembly is used to extrude polyvinyl chloride. The core pin 31 should be made from a metal or a plastic having a low modulus of elasticity such as titanium to provide maximum extendability for a given load and long life.

The embodiment of the die assembly seen in FIGS. 7 and 9, designated generally by the numeral 43, has a central body portion 44 provided with an axial bore 45 therethrough. The wall surface 46 defined by the axial bore 45 tapers inwardly from the top to the bottom of the bore. An upper flange 47 is coupled to the top of the body 44 by means of cap screws 48 received in openings 49 in the flange and threadably engage a tapped screw bore 50 provided in the top surface of the body. The flange is integrally formed with a conduit 51 having a generally cylindrical bore 52 in its upper end which terminates in a generally enlarged conical bore 53 at the lower face thereof. The base of the conical bore 53 merges into the top of the axial bore 45 of the body. A cylindrical sleeve 54 is coupled to the lower end of the body 44 by means of bottom flange 55. Bottom flange 55 is provided with a plurality of vertically disposed openings 56 therethrough which receive cap screws 57 engaging threaded bores 58 provided in the bottom of the die body. The bottom flange 55 is also provided with a plurality of transverse threaded bores 59 which receive cap screw 60 having their inner ends in contact with the upper portion of sleeve 54. An annular thin wall section 61 is provided in the cylindrical sleeve 54 immediately above the inner ends of cap screws 60. The cylindrical sleeve 54 is provided with an axial cylindrical bore 61 therethrough.

A core pin or mandrel, designated generally by the numeral 62, is received in the axial bore 45 of the body and in the axial bore 61 of the sleeve. The core pin consists of two parts, the upper head portion 63 and a lower leg portion 64. The head portion is provided with a generally conical top section 65 which is positioned in the generally conical cavity 53 provided in the upper flange 47. A plurality of spiders or bosses 66 project from the side wall of the head 63 and make contact with the wall 46 of body 44 to hold the core pin in a fixed position inside the body and the sleeve. The lower face of head portion 63 is counterbored to provide a large, generally cylindrical recess 67 therein. The lower portion of the inner wall 68 is provided with threads 69 which engage corresponding threads 70 provided on the upper end of the leg portion 64 of the core pin. The lower portion of the core pin 64 is provided with a generally cylindrical axial bore 71 extending to the lower end thereof. The bore is closed by end wall 72 which provides an axial bore 73 therethrough. The portion of the upper end of the core pin 64 that is received in the axial bore 45 has an increased wall thickness to provide increased rigidity. The lower end of the core pin which is received in the cylindrical bore 61 has thin walls in order to provide the flexibility necessary for the proper elongation and contraction of the length of the core pin.

A piston rod 74 having a close sliding fit is received in the bore 71 provided in the lower portion of the core pin. A piston head 75 is attached to the upper end of the piston rod 74 and is received in the upper portion of the cylindrical recess 67. An O ring 76 and a backup ring 77 are received in a recess 78 provided in the outer wall of the piston head. Additionally, O ring 79 is provided in annular recess 80 provided in the top portion of the leg section 64 of the core pin. Another O ring 81 is provided in a recess 82 provided in the top portion of the piston rod 74.

An axial bore 83 is provided in the piston rod 74 which terminates at its lower end in a threaded opening 84. The bore 83 terminates at its upper end opposite annular groove 86 provided in the side wall of the piston rod at its uppermost end. Transverse openings 85 communicate the upper end of the axial bore 83 with the annular groove 86. The annular groove 86 communicates with diagonal bores 87 and 87a provided in the upper portion of the lower leg 64 of the core pin and the head portion 63 of the core pin, respectively. The bore 87 communicates with a bore 88 provided in the body 44. Air for blowing the parison into the finally desired shape is supplied through bores 83, 85, 86, 87 and 88. Hydraulic fluid is supplied from a source described hereinafter to the space above the top of the piston 75 through opening 151 in the body 44 which communicates with a bore 152 provided in a spider 66 and the head portion of the core pin 63. A fitting 153 for the hydraulic fluid line 154 is threadably received in the opening 151. As seen in FIG. 9, another opening 155 is provided through the body 44, a spider 66, and the head 63 of the core pin to admit hydraulic fluid to the annular space 67 on the underside of the piston 75. By applying hydraulic pressure to the top of piston 75 the thin walls of the lower portion of the leg 64 are stretched causing the orifice 96 to become smaller. When hydraulic pressure is applied to the underside of the piston, the thin walls of the leg 64 are contracted and orifice 96 becomes larger.

A separable core pin tip 89 is attached to the end wall 72 at the lower end of the core pin by means of a cap screw 90 received in the threaded lower end 84 of the bore 83. The cap screw 90 is provided with an axial bore 91 therethrough in order to permit passage of the air from the bore 83 to blow the plastic parison into the form desired.

The lower end of the cylindrical sleeve 54 is provided with a threaded portion 92 which has threadably attached thereto a sleeve bushing 93. The lower face of the cylindrical sleeve 54 is provided with a recess 92a which faces a like recess 94 provided in the upper face of the bushing. An annular spacer ring 95 is received in this recess. By using spacer rings of different thicknesses it is possible to make different, accurate and fixed spacings between the bushing and the tip and thus to vary the width of the orifice 96. The width of the orifice 96 is determined by the space between the inner wall 93a of the bushing and the outer wall 89a of the core pin tip 89. Also by using different sized tips in conjunction with different sized spacer rings 95, a wider variation may be achieved in the spacing between these components to provide a wide range of thickness for the walls of the extruded parisons by adjusting the spacing of the orifice 96. A plurality of recesses 97 are provided in the bottom of bushing 93 in order that a pin wrench may be used to attach and remove the bushing from the end of the sleeve 54.

In order to correct any asymmetry in the orifice 96, the spacing between segments of the inner wall 93a of the bushing and the outer wall 89a of the tip can be adjusted by flexing the cylindrical sleeve 54 using cap screws 60 to flex the thin section 61 provided at the upper end of the cylindrical sleeve. Thus, any asymmetry existing in the parison walls may be corrected by fine adjustments of these cap screws while the die apparatus is in operation.

As seen in FIG. 8 an alternate embodiment is shown for the lower end of the die apparatus which utilizes a fixed bushing 98 attached to the lower end of the sleeve 54 by means of cap screws 99. The orifice 96 may have its width adjusted by utilizing washers 100 of various thicknesses positioned between the tip 89 and the lower end wall 72 of the core pin or mandrel 64. This arrangement permits a quick change to achieve an increase or decrease in the width of the orifice 96 by detaching the removable bushing 98, then removing the mandrel tip 89 and replacing washing 100 by either a thicker or thinner washer to provide an increase or decrease in the spacing between these components and thus changing the thickness of the parison extruded through the orifice 96. This embodiment provides means for rapid changing of the width of the orifice 96 without completely disassembling the die assembly.

As seen in FIG. 10, still another embodiment of an adjustable bushing is provided for the die of the present invention. This bushing 101 is provided with an internally threaded collar 102 adjacent its upper end which is threadably received on the threaded portion end 103 of the bottom of the cylindrical sleeve 54. These threads are made to engage very tightly so that there is no chance of movement of the bushing 101 after it is positioned on the end of cylindrical sleeve 54. In this embodiment a thin wall, annular, cylindrical extension 104 of the cylindrical sleeve is provided at its lower end which has a surface closely abutting and slidably engaging the inner wall 105 of the bushing 101.

As seen in FIG. 11 another alternate form of adjustable mandrel tip 106 has a reduced cylindrical threaded portion 107 at its upper end threadably engaging a mating threaded portion of the lower end of the mandrel 64. The lower end of the mandrel 64 is provided with a thin wall, depending, annular ring extension 108 on the bottom end thereof which makes sliding contact with the outer wall of the adjustable tip 106. This skirt provides a seal to prevent ingress of polymer into the threaded section as it flows out to form the parison. The tip 106 is screwed into or out of the threaded end of the mandrel 64 to change the opening of the extrusion orifice and thus change the wall thickness of the parison. Again in this embodiment the threads are made quite close fitting in order that the tip will not move after it has been placed in a fixed position.

Figure 12:
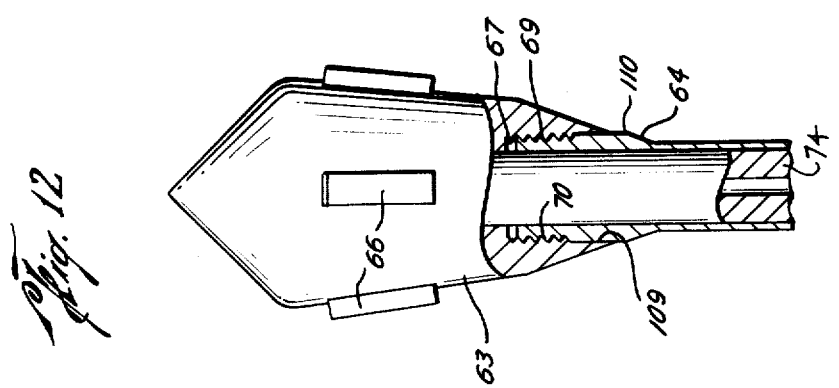
FIG. 12 is an elevational view, partially in section, of another embodiment for the adjustable mandrel of the die of the present invention.

As shown in the embodiment of the core pin seen in FIG. 12, further adjustments to the spacing for the orifice 96 may be obtained by providing for adjustment between the mandrel head 63 and lower portion 64. The mandrel head portion 63 has a cylindrical recess 67 in its lower end provided with threads 69 mating with threads 70 provided on the upper end of the leg portion 64 of the mandrel. The lower end of head terminates in a smooth, sharply tapered bottom skirt 109 having a smooth inner wall which engages the cylindrical surface 110 provided at the upper end of the leg portion of the core pin to provide a tight seal therebetween. By screwing the leg portion 64 of the core pin into or out of the head or upper portion 63, the tip of the core pin will be brought closer to or further away from the opposed surface of the bushing provided at the lower end of the die assembly and thus the width of the orifice may be varied considerably.

Figure 14:
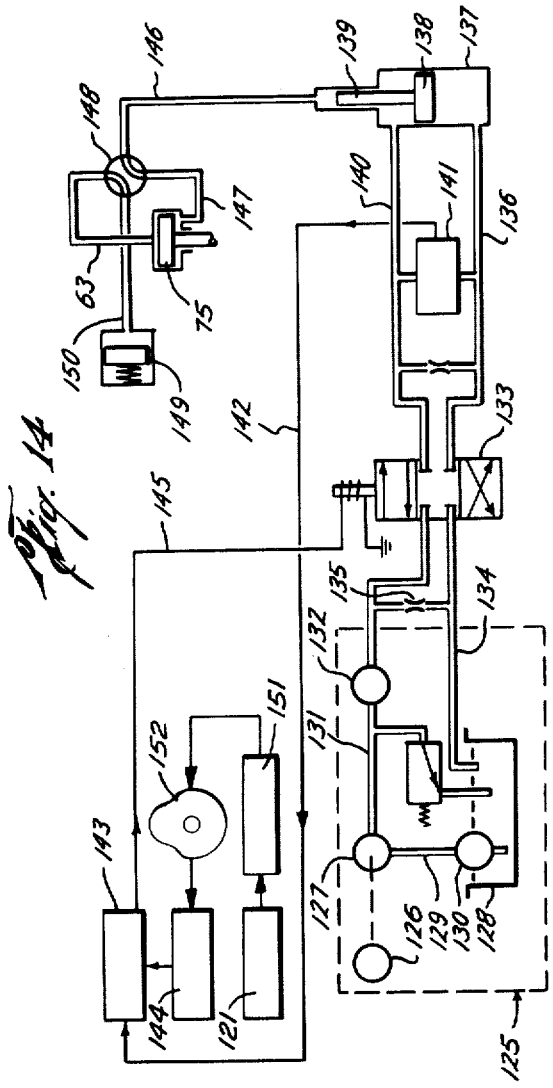
FIG. 14 is a schematic diagram of the hydraulic system utilized in th present invention.
Figure 13:
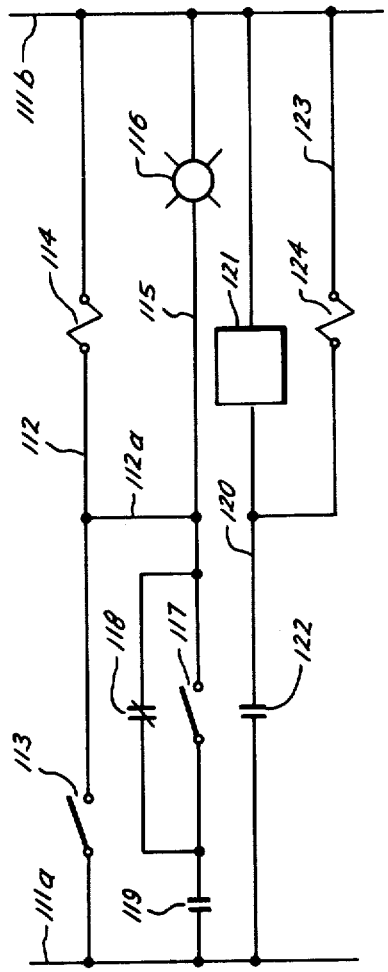
FIG. 13 is a schematic diagram of the electrical system utilized in the present invention.

Referring now to FIG. 13 a schematic for the electrical system of the parison extrusion apparatus of the present invention is shown. Electrical power is supplied to the apparatus by means of wires 111a and 111b. Electrical lead 112 is connected across the power supply wires 111a and 111b. Lead 112 has a spring loaded limit switch 113 in the circuit which switch is actuated by the blow molder knife (not shown) that cuts the parison off the bottom of the die. Upon closing of switch 113 time delay relay 114 is actuated. Electrical lead 115 also is connected between line 111a and 111b. In line 115 is the dwell light 116 and limit switch 117 which is normally closed and opens at the end of the cam cycle. Bridged across limit switch 117 is one set of contact points 118 carried on time delay relay 114. To the left of limit switch 117 is also another set of contact points 119 also carried by time delay relay 114. Line 112a connects across line 112 and line 115. Lead line 120 is also connected across the two power supply lines and energizes the motor speed control 121. As seen in FIG. 14, the motor speed control 121 drives the cam motor 151 which in turn drives a cam 152 having a configuration of the outside surface of the bottle. In line 120 a third set of contacts 122 carried by the time delay relay 114 is present. In line 123 connecting from the midpoint of line 120 to power line 111b there is provided a control relay 124 which serves to open the electrical circuit to the motor brake on the cam motor.

The electrical sequence carried out in the apparatus of the present invention is as follows. The knife that severs the parison after it is fully extruded momentarily closes limit switch 113 which energizes time delay relay 114 through electrical lead line 112. When time delay relay 114 is energized, the contact 119 carried thereon closes and in conjunction with contacts 118 energized the dwell light together with holding the time delay relay 114 in the in or closed position. Intermittent contacts 122 carried by the time delay relay 114 are closed and complete the circuit across line 120. This energizes the motor speed control which starts the cam motor driving the rotatable, generally circular cam which programs the hydraulic system to vary the orifice of the parison extrusion and thereby vary the wall thickness of the subsequently blown bottle. The cam has a peripheral shape conforming to the desired wall thicknesses of the extruded parison. After the cam completes its cycle, the limit switch 113 opens. This in turn de-energizes time delay relay 114, opens contact 122 and also opens contact 119. When contact 122 opens, the motor speed control 121 is de-energized and control relay 124 opens which closes the motor brake circuit and stops the cam drive thus bringing the sequence to a close. The controller on the parison extruder apparatus then begins another cycle and extrudes a parison and the knife moves to cut the parison thus energizing limit switch 113 and beginning the cycle over again.

Referring now to FIG. 14, the hydraulic system and the associated electrical components are schematically presented in this figure. The hydraulic pressure for actuating the piston in the die apparatus includes a hydraulic power package designated generally 125. In this power package or supply is included an electrical motor 126 which drives a hydraulic pump 127. The pump picks up hydraulic oil from storage vessel 128 through line 129 having filter 130 on the end thereof. The pump supplies hydraulic oil under pressure through line 131 through another filter 132 to a servo valve 133. Line 134 returns oil to the supply vessel 128. Bypass valve 135 is provided between lines 131 and 134 to make adjustments to the hydraulic system. Output from the servo valve 133 is carried by line 136 to the booster cylinder 137. In one embodiment of the apparatus constructed, input pressure to the top of the piston 138 in the booster cylinder ranged from 0 to 1500 psi. Output pressure from the piston rod 139 varied from 100 to about 8000 psi. Line 140 connects servo valve 133 to the booster cylinder 137 at the underside of the piston 138 and normally carries no pressure. A differential pressure controller 141 is connected across lines 136 and 140 and generates a D.C. feedback signal proportional to the differential pressure existing between the hydraulic pressure in lines 136 and 140. Electrical lead 142 conveys the D.C. signal to a D.C. servo controller 143. The signal supplied through line 142 is the pressure feedback signal which makes corrective action to the signal generated by the D.C. servo controller 143 which is actuated by a variable signal generated by a linear potentiometer 144 which is actuated by the cam 152 driven by the cam motor 151 controlled by motor speed control 121. Electrical lead line 145 carries the signal to the servo control valve 133 which regulates the flow of oil from line 132 to either return line 134 or to line 136 to vary the pressure applied to the top of the booster cylinder 138. Output from the amplified hydraulic booster piston 139 is carried by line 146 through valve 148 to either the top of the piston 75 through line 63 or to the bottom of the piston by line 147. A surge chamber 149 is connected to valve 148 by line 150 to receive excess oil when shifting pressure between the top and bottom of the piston 75. Variations in the hydraulic pressure applied to the topside or to the underside or the mandrel control the expansion and contraction of the lower, thin wall portion of the mandrel or core pin and thus controls the width of the opening of the orifice at the bottom of the die apparatus and regulates the thickness of the wall of the parison which is subsequently blown into the bottle.

Figure 15:
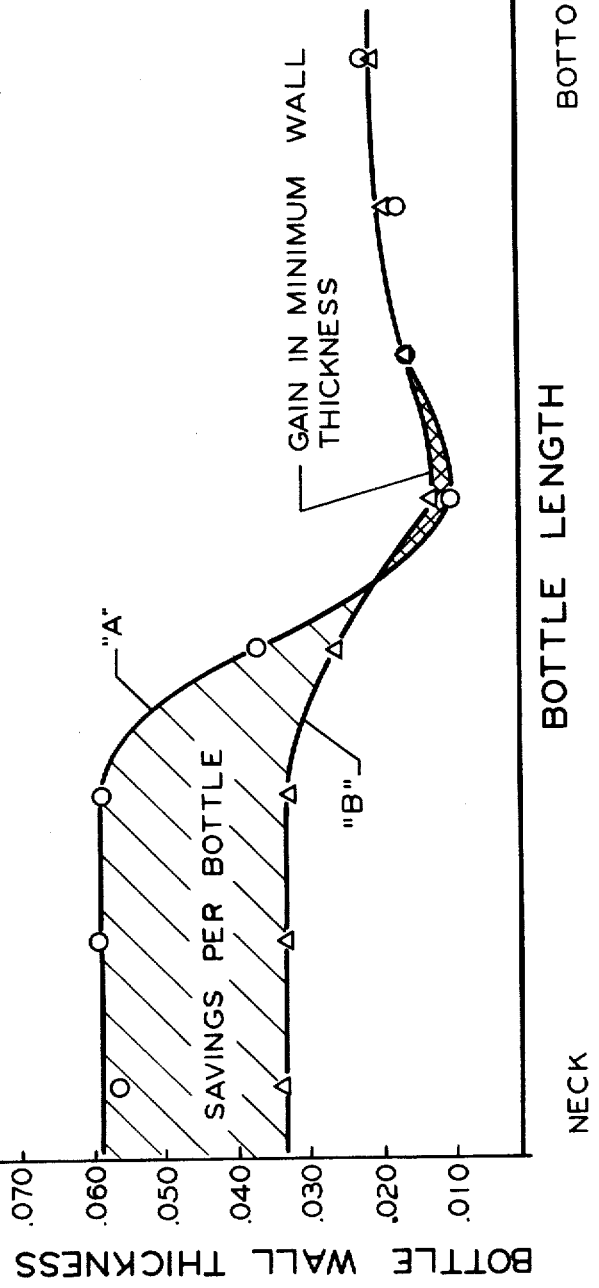
FIG. 15 is a graph of the wall thickness of bottles made both with and without the use of the apparatus of the present invention.

A prototype die assembly constructed substantially as shown in FIG. 7 of the drawings was fabricated and attached to a commercial Bekum SE60 extruder having a Bekum HB 110 blowing unit attached thereto. An electrical and hyraulic system substantially as shown in FIGS. 13 and 14 was utilized in the prototype test run. The blow mold utilized in the test had a cavity substantially in the shape of a truncated sphere which produced a generally spherically shaped bottle having a capacity of 15.2 ounces of liquid. A generally circular, rigid, plastic cam having a peripheral shape proportional to the bottle was constructed and utilized for the prototype test run. The tip of the mandrel and the bushing opening was round since it was desired to provide uniform distribution of plastic material in the side wall of the bottle. The cam was cut so that the hydraulic pressure applied to the top of the piston in the die assembly was 4,500 pounds at the maximum deflection position, i.e., at the point where the thinnest portion of the plastic parison was desired. When this pressure was applied to the piston, it was determined that the mandrel tip had a deflection of 0.023 inch. The extruder was operated using commercial polyvinyl chloride compound feed to produce a polyvinyl chloride bottle. The significant thickness reductions in the neck of the bottle obtained by using the elastic parison programming die apparatus is depicted in FIG. 15. Also a comparison of the significant dimensions and weights between the programmed and unprogrammed bottle is set forth in the table below:

|  | 15.2 Oz. Custom Round (Test Bottle) | | | Max. Possible Prod. Rate |
|---|---|---|---|---|
|  | Net Bottle Wt. | Max. Wall Thk. | Min. Wall Thk. |  |
| Unprogrammed | 33.9 grams | .057 in. | .010 in. | 600 btls/hr |
| Programmed | 29.1 grams | .033 in. | .012 in. | 900 btls/hr |

From the above it is noted that with the hydraulically actuated expansionable mandrel assembly 42 percent of the material in the neck of the bottle when run with an unprogrammed, i.e., continuous wall thickness parison was removed from the bottle when it was programmed. Additionally, a significant increase in bottle production, i.e., about 50 percent was obtained because the bottles could be more rapidly cooled due to the fact that the neck contained a much smaller quantity or thickness of plastic material which required shorter cooling time. Additionally, it is seen that the minimum wall thickness of the bottle was increased by some 20 percent to provide a far more uniform bottle. Additional tests were performed on a synthesized bottle to establish if rapid changes could be made in the thicknesses of the portion of the parison from which the upper portion and neck of the container would be formed. It was found that very rapid changes could be made without any marks being left on the parison and that precise control could be exercised over the quantity of plastic contained in any proportional part of the extruded parison.

From the foregoing it can be seen that the die extrusion apparatus of the present invention provides excellent control for the wall thicknesses in a parison whereby precise shapes and thicknesses may be obtained in the finished bottle. Additionally, by programming the parison using the apparatus of the present invention it has been found possible to increase the production rate of bottles using a standard machine by some 50 percent.

While there has been described what is at present considered preferred embodiments of the present invention, it will be apparent to those skilled in the art that various modifications and changes may be made without departing from the essence of the invention. It is intended to cover herein all such modifications and changes as come within the true scope and spirit of the following claims.

We claim:

1. In an apparatus for controlling the extrusion of plastic parisons, the combination comprising:
   a. a cam having a peripheral surface conforming to the desired wall thicknesses of the extruded parison;
   b. cam drive means;
   c. means coupled to said cam to generate an electrical signal proportional to the shape of said cam;
   d. means for controlling fluid pressure actuated by the means of subparagraph (c);
   e. means for supplying fluid pressure to the means of subparagraph (d);
   f. means coupled to the means of subparagraph (d) for boosting the pressure of the fluid from the means of subparagraph (e); and
   g. means coupled to the means of subparagraph (f) for varying the wall thickness of said extruded plastic parisons.

2. In the apparatus of claim 1 means coupled to the output of the means for subparagraph (d) for supplying corrective action to the means for subparagraph (c).

3. In the apparatus of claim 1 wherein the means of subparagraph (c) is a linear potentiometer, the means of subparagraph (d) is an electrically controlled servo control valve, the means for subparagraph (f) is a hydraulic pressure booster assembly, and the means of subparagraph (g) is a die assembly for extruding said plastic parison.

* * * * *